June 13, 1961  H. M. FOX  2,987,875
RAMJET POWER PLANTS FOR MISSILES
Filed May 26, 1955
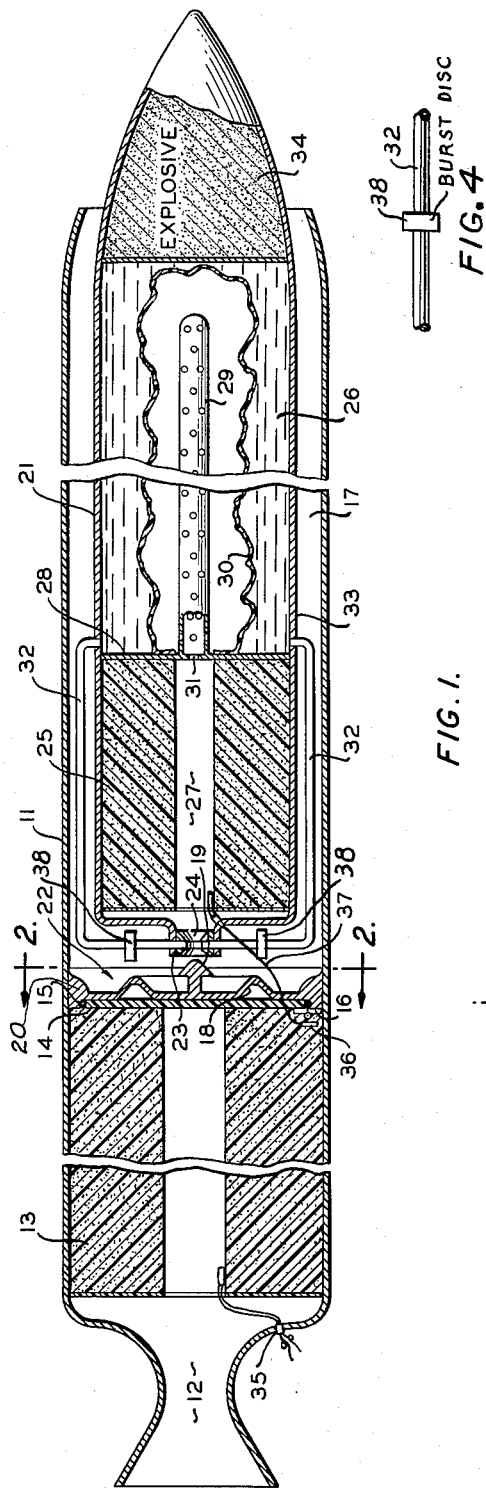
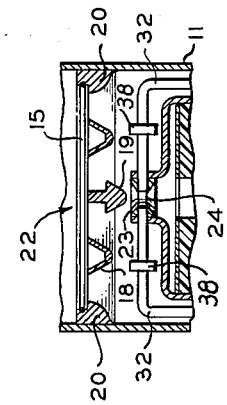
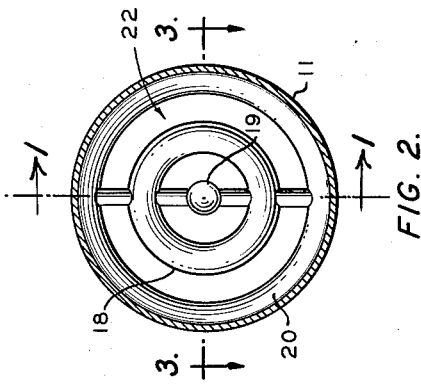
*INVENTOR.*
H. M. FOX
BY
ATTORNEYS

United States Patent Office 2,987,875
Patented June 13, 1961

2,987,875
RAMJET POWER PLANTS FOR MISSILES
Homer M. Fox, Bartlesville, Okla., assignor to Phillips Petroleum Company, a corporation of Delaware
Filed May 26, 1955, Ser. No. 511,147
7 Claims. (Cl. 60—35.6)

This invention relates to power plants for missiles. In one aspect, it relates to improved ramjet power plants for explosive missiles. In another aspect, it relates to ramjet propulsion systems having improved take-off characteristics and which are simple and highly efficient over a wide range of altitudes in which the expended rocket booster unit case serves as the combustion chamber for the liquid ramjet fuel.

Large missiles are usually composed of two power plants, one called the booster and the other called the sustainer. The booster is required to provide high initial thrust to accelerate the missile from take-off to a very high velocity in a short period of time. As soon as the booster burns out, it is automatically detached to reduce the flight weight of the missile. The booster usually has a solid rocket propellant system. The sustainer is a liquid rocket, solid rocket, ramjet, or a rocket-ramjet system. The ramjet is usually the most economical system to manufacture, when considering fuel costs, and has a greater range than many other types of power plants. However, other power systems sometimes have advantages which make them more acceptable than ramjet systems for certain specific applications.

One disadvantage of the conventional ramjet sustainer is the large space required for combustion of the fuel. This large space plus a rocket booster positioned rearwardly of the rear end of the ramjet sometimes makes the missile unwieldly as regards length. If the booster rocket were mounted below the ramjet to shorten the missile's overall length, aerodynamic and trajectory problems are presented.

Prior art shows that detachable rocket booster units have generally been used because there has been little justification for carrying along the weight of a spent booster unit after launching has been accomplished. Detaching a rocket booster unit is disadvantageous because special controls are required and also because it presents a hazard to life and property upon which it may fall.

In my invention, instead of detaching the booster unit and providing a large additional space for the ramjet combustion chamber, I use the expended rocket booster unit as the ramjet combustion chamber. The booster unit is separated from the remainder of the missile by a diaphragm which is ruptured at some time during the last portion of the booster phase of the missile flight, that is, shortly before the ramjet power unit takes over. The expended rocket booster unit has a large chamber which provides a sufficiently large volume for complete combustion of the ramjet fuel. The same combustion product discharge nozzle, with or without area control, is used for the ramjet as for the booster rocket, thereby saving the weight of a second nozzle during take-off and acceleration periods. Additional weight is saved by using the booster unit as the ramjet combustion chamber because detachment gear and control equipment therefor is not needed. Such lessening of weight improves trajectory characteristics.

My invention also involves use of a slow-burning rocket propellant to pressurize the ramjet fuel tank, to heat, to vaporize and to crack the ramjet fuel. Cracking of the ramjet fuel results in the production of hydrogen, acetylene and other high flame speed fuels which increase combustion stability. Combustion stability is also increased by the pilot action of the hot gaseous products from the slow-burning propellant. In a missile using liquid fuel in the ramjet power unit, there is a demand for this liquid fuel over a relatively long period of time. A slow-burning propellant, such as an ammonium nitrate-containing propellant described and claimed in copending application, Serial No. 479,321, filed January 3, 1955, is therefore used for gas generation systems to supply pressure to the liquid fuel tanks of the missile of this invention.

An object of my invention is to provide a missile propulsion system operable with high efficiency over a wide range of altitudes and with improved take-off characteristics.

Another object of my invention is to provide a missile power plant which is smaller in size, contains less control equipment, and is lighter in weight than those now available.

Still another object of my invention is to provide such a power plant which automatically provides pressure for the ramjet liquid fuel tank and sufficient temperature and heat to vaporize and to crack the liquid fuel to stabilize the combustion thereof.

Yet another object of my invention is to provide a missile in which the expended rocket booster unit case serves as the combustion chamber for the liquid ramjet fuel.

Still other objects and advantages of my invention will be realized upon reading the following disclosure and drawing which respectively describes and illustrates my invention.

In the drawing, FIGURE 1 is a longitudinal view, partly in section, of a form and arrangement of apparatus of my invention taken along the line 1—1 of FIGURE 2.

FIGURE 2 is a sectional view taken on the line 2—2 of FIGURE 1.

FIGURE 3 is a sectional view taken on the line 3—3 of FIGURE 2.

FIGURE 4 illustrates burst discs disposed in tubes 32.

The ducted rocket-ramjet motor of my invention comprises a ramjet motor body, a rocket utilizing solid fuel positioned within said motor body, and means for introducing ramjet motor fuel into the exhaust of the rocket. Further, it comprises a ramjet motor body, a rocket utilizing a rapid-burning propellant positioned within and near the rear end of said motor body as regards direction of travel thereof, a ramjet motor in said body in front of said rapid-burning propellant as regards said direction of travel, and said ramjet motor having a fuel tank, a slow-burning rocket propellant for pressuring said fuel tank, means for directing fuel from said fuel tank into the exhaust of said slow-burning solid propellant, means for directing the exhaust of said slow-burning propellant and said fuel from said fuel tank into the space formerly occupied by said rapid-burning propellant after said rapid-burning propellant is removed by its combustion.

The invention also comprises the method of igniting a fast-burning rocket propellant within a combustion zone of said motor, igniting a slow-burning rocket propellant within said motor, pressuring liquid fuel from a storage zone in said motor by pressure of gases from the burning slow-burning propellant, directing the pressured fuel from said storage zone and a stream of air into said combustion zone, and effecting combustion of said fuel with said stream of air in said combustion zone to produce thrust.

In the drawing, reference numeral 11 refers to a case which contains the two power plant units to be described hereinbelow. The first of these units is a booster power unit and the second is the ramjet unit. These two power units are combined to operate as a single, unitary combat missile.

The booster power plant is positioned within case 11 just inside an exhaust nozzle 12 and comprises a solid booster propellant 13. While the solid propellant 13 is illustrated as having a cylindrical opening along its axis, the opening can be square or other shape, or the grain (solid propellant) can be multiple perforated, of strain perforation, of star perforation, or it can be of a cigar-burning type. This booster propellant is separated from the remainder of the missile by a hinged diaphragm 14 which can be ruptured or opened by one or more of a number of ways at a time at least near the end of the burning of the booster charge and before the ramjet power plant begins to provide for the propulsion of the missile. The diaphragm 14 is smaller in diameter than case 11 and is provided with an O-ring or other suitable seal 15 and is hinged at 16 to ring 20 so that after propellant 13 is burned, the diaphragm 14 is forced from right to left to allow passage of air from annulus 17 to the space previously occupied by the propellant 13. Preferably, diaphragm 14 is made of a combustible material, such as a combustible plastic or other suitable material, so that it is consumed and does not interfere with subsequent combustion or with gas flow. While diaphragm 14 is made of a combustible material it must be of such a nature as to withstand back pressure from the burning propellant 13. By combustible material of which the diaphragm is made, I mean such a material as wood, plastic, and aluminum, magnesium, or the like.

Disposed immediately in front of, as regards direction of missile travel, the hinged diaphragm 14 is a flame holder ring 18. In the center of this ring is a flame spreader 19. Disposed around the inside of the case 11 is an annular ring 20. This annular ring 20 is rigidly attached to the case 11 by welding, if desired, or under some conditions, it is made integral with the case. It is to this annular ring 20 that the hinge 16 is attached. The flame spreader 19 and flame holder ring 18 are, if desired, constructed as a unitary element for assembling within case 11 adjacent the annular ring 20. Under some conditions and if desired, the flame spreader-flame holder assembly 22 is made integral with the ring 20 and the entire unit is then attached to the inner wall of case 11 by welding, or other suitable means.

During the time the booster charge is burning, the hinged diaphragm 14 is in its closed position with the O-ring 15 sealing against leakage of combustion gases from the burning booster charge between the diaphragm and the annular ring 20. The flame holder ring 18 is so positioned as to act as a support for the diaphragm. The diaphragm can be made of relatively thin material when so supported.

In front of the flame spreader-flame holder assembly 22 is positioned an orifice ring 23 having a centrally disposed orifice 24. This orifice ring 23 is mounted in the rear constricted end of a housing 21, as shown, and is so positioned that the orifice 24 and the flame spreader 19 are disposed along the axis of case 11. In the portion of housing 21 adjacent ring 23 is positioned a mass of slow-burning propellant 25. An opening 27 extends through the body of slow-burning propellant 25. The slow-burning propellant 25 is under some conditions of the same composition as the booster propellant 13, but if desired, it can be another propellant, and as herein contemplated, it is a slower-burning propellant than propellant 13.

In front of this slow-burning propellant 25 is a tank 33 for a liquid ramjet fuel 26. A partition 28 forms one endwall of the fuel tank and the front end of the compartment in which the slow-burning propellant 25 is positioned. From the front side of partition 28 a perforate tube 29 extends toward the front end of the missile. Surrounding tube 29 is an inflatable bag 30 which is attached gas-tight to partition 28. An opening 31 in partition 28 provides for communication from opening 27 to the space within the perforate tube 29. Tubes 32 provide for passage of liquid ramjet fuel 26 from tank 33 to the orifice 24 in ring 23.

Burst discs 38 prevent leakage of liquid fuel 26 through tubes 32 while the missile is setting in an upright stationary position. Also, while accelerating, the burst discs prevent fuel leakage or flow through tubes 32 until a predetermined disc rupture pressure is reached.

While the missile is in flight under power of the booster propellant, and before the ramjet takes over, air pressure on the liquid fuel 26 in tank 33 is equalized by communication afforded by tubes 32 on the one hand, and by communication via perforations in tube 29, opening 31 in partition 28, opening 27 in the slow-burning propellant 25 and orifice 24 so that liquid fuel 26 does not flow through tubes 32 before rupture of the diaphragm 14.

An explosive charge 34 is disposed in the head of this missile, as indicated, or it can be positioned in any other suitable location. A proximity fuse or a contact fuse, not shown, can be provided for setting off the explosive.

In the operation of this hereindisclosed multiple power plant assembly, the booster propellant 13 is ignited in any desired or conventional manner as by an igniter 35. The igniter is so placed as to initiate burning at a burning surface, such as the inner cylindrical surface of the propellant 13. When the booster propellant is ignited, the missile is thereby launched and rapidly gains speed and altitude. When the booster propellant 13 is substantially burned out a second igniter assembly 36 operates to start combustion of the slow-burning propellant 25. This second igniter can be a fuse operated igniter, or any other suitable type of igniter. By using a fuse operated igniter in place of an electrically operated device the weight of a battery and electrical wiring, etc., is eliminated.

It is intended that by the time the igniter assembly 36 operates to ignite the slow-burning propellant 25, the booster propellant 13 is substantially all burned, and when the booster propellant is substantially consumed the diaphragm 14 opens on hinge 16. The diaphragm 14 can, under some conditions, begin to burn before all of the booster propellant is burned, or the diaphragm can begin to burn after it is opened and ignition of the slow-burning propellant has begun.

When the slow-burning propellant 25 begins to burn, pressure of its products of combustion is transmitted through opening 31 and through the perforations in tube 29 to inflate bag 30. As bag 30 is inflated, the liquid fuel 26 is forced from tank 33 through tubes 32 to the orifice 24. As the liquid fuel issues from tubes 32 into the orifice 24, it is atomized by the high velocity gases of combustion of the slow-burning propellant 25 and by the shock waves therefrom and the accompanying high temperature cracks, the atomized fuel and the cracked fuel rapidly burns in the presence of air from the annular air inlet 17. The flame spreader 19 serves to spread the flame passing through orifice 24 and to assist in mixing the atomized and/or cracked fuel with the air to promote combustion. The flame holder ring 18 and the annular ring 20 assist in stabilizing combustion within the space previously occupied by the booster propellant 13.

The solid booster propellant can be any suitable solid propellant known in the art. For example, it can be a composite type containing ammonium nitrate or ammonium perchlorate as the oxidizer and a binder such as a methylvinylpyridine/butadiene copolymer. It can also be a double base propellant, such as one containing nitrocellulose and nitroglycerine, with various additives for burning rate control.

The solid slow-burning propellant can be of the same composition as the booster propellant, but formed with a thicker web, or without burning rate catalyst. It is intended that the burning time of the slow-burning propellant be the same as the burning time of the liquid ramjet fuel 26 in tank 33.

The chief purpose of the orifice ring 23 is to assist in producing pressure for pressurizing the liquid fuel tank 33. Another purpose of the orifice ring 23 is to provide an orifice for positioning the discharge ends of tubes 32 so as to produce a venturi effect for assisting passage of liquid fuel from tank 33 to the combustion zone.

The inflatable bag 30 within the fuel tank 33 is preferably made of a synthetic elastomer or other flexible material which will withstand solvent and penetrating action of the ramjet fuel.

As mentioned hereinbefore, one of the advantages of my invention is the use of the slow-burning rocket unit to pressurize the ramjet fuel tank and to supply heat for vaporization of the ramjet fuel and stabilization of its combustion during the entire flight of the missile after the booster charge is expended.

An important advantage of my propellant system is that the booster charge is encased within the rear end of the main casing and when the booster charge is consumed, the space previously occupied thereby then becomes the combustion zone for the main ramjet fuel. This arrangement of elements eliminates the need for a separate booster rocket mounted outside the main casing and means for its detachment after it is burned out.

A suitable liquid fuel for use in the hereindisclosed ramjet power unit is such a fuel as the JP–4, or the JP–5 fuel. Such a fuel is introduced into the combustion zone by way of the orifice 24 by the pressure difference between the pressure in the inflatable bag 30 and that existing at the outlet ends of tubes 32. The high gas velocity and the shock waves in the pressurizing propellant exhaust rapidly atomizes the liquid fuel and the high temperatures therein crack the atomized and/or vaporized fuel to constituents of high combustion stability.

The slow-burning propellant of my invention can, if desired, be a liquid propellant in place of the herein described solid propellant for pressurizing and ramjet fuel vaporizing purposes. When a liquid propellant is used, it can be either a monopropellant or a bipropellant system. Examples of monopropellant fuels which can be used, are, hydrazine, nitroparaffin and ethylene oxide. If a monopropellant is used, hydrazine is preferred because the hydrogen liberated by its decomposition helps to stabilize the ramjet fuel combustion. Examples of bipropellant fuels are the hypergolic systems such as nitric acid and aniline, turpentine or furfuryl alcohol, and the non-hypergolic systems where the oxidizer is liquid oxygen, nitric acid, or hydrogen peroxide, and the fuel is a jet fuel, such as alcohol, ammonia, etc., or a jet aircraft hydrocarbon fuel such as JP–4.

While certain embodiments of the invention have been described for illustrative purposes, the invention obviously is not limited thereto.

I claim:

1. A ducted ramjet motor assembly comprising, in combination, an elongated motor housing, a ramjet motor in said housing, said ramjet motor comprising a fuel tank near the front end of said housing as regards its direction of travel, a combustion chamber adjacent the rear end of said housing, a fast-burning rocket propellant mounted in said combustion chamber, a slow-burning rocket propellant intermediate said combustion chamber and said fuel tank, an annular ring disposed intermediate said combustion chamber and said slow-burning propellant, the axis of said annular ring coinciding with the axis of said housing, a pressure-sealing diaphragm separating said fast-burning propellant from said annular ring, said pressure-sealing diaphragm being movable in the direction of said combustion chamber to relieve pressure on the side of the diaphragm adjacent said ring, a conduit extending from said fuel tank through the wall of said annular ring to form a venturi for passage of fuel from said tank to the throat of said venturi, an inflatable bag in said fuel tank, and a conduit leading from the region of said slow-burning propellant into said inflatable bag for passage of combustion gas from said slow-burning propellant into said bag for pressuring the fuel in said tank when said slow-burning propellant burns.

2. A ducted ramjet motor assembly comprising, in combination, an elongated motor housing, a ramjet motor in said housing, said ramjet motor comprising a fuel tank near the front end of said housing as regards its direction of travel, a combustion chamber adjacent the rear end of said housing, a fast-burning rocket propellant mounted in said combustion chamber, a slow-burning rocket propellant intermediate said combustion chamber and said fuel tank, an open end expansible bag in said fuel tank, an opening in the rear end of said fuel tank as regards said direction of travel for passage of pressure gas, the open end of said expansible bag being disposed around said opening and supported gastight by said fuel tank, an annular ring disposed intermediate said combustion chamber and said slow-burning propellant, the axis of said annular ring coinciding with the axis of said housing, a removable diaphragm intermediate said combustion chamber and said annular ring, a conduit extending from said fuel tank through the wall of said annular ring to form a venturi for passage of fuel from said tank to the throat of said venturi, a deflector disc disposed on the side of said venturi adjacent said diaphragm to deflect gases passing through said venturi toward the walls of said combustion zone and a conduit leading from the region of said slow-burning propellant into said expansible bag for passage of combustion gas from said slow-burning propellant into said bag for pressuring the fuel in said tank into said conduit extending from said fuel tank when said slow-burning propellant is burned.

3. In the motor assembly of claim 2 wherein said diaphragm is made of a combustible material.

4. In a ducted ramjet motor assembly having a fuel tank adapted to contain liquid ramjet motor fuel, said fuel tank being positioned at least near the front end of said assembly as regards its normal direction of travel, a combustion chamber for combustion of said ramjet motor fuel near the rear end of said assembly as regards its normal direction of travel, the improvement, comprising, a fast-burning rocket propellant disposed in said combustion chamber, an annular ring supported by the inner wall of said assembly immediately in front of said combustion chamber, a combustible diaphragm of diameter smaller than the diameter of said inner wall, said diaphragm being hinged to said annular ring to open in the direction of said combustion chamber, said hinged diaphragm sealing said combustion chamber from the forward portion of said assembly, a slow-burning rocket propellant disposed intermediate said hinged diaphragm and said fuel tank, a venturi disposed at least near the rear end of said slow-burning propellant and in front of said hinged diaphragm, a conduit providing communication from said fuel tank to the throat of said venturi, flame spreading and flame holding means adjacent the rear end of said venturi, an open end expansible bag in said fuel tank, an opening in the rear end of said fuel tank as regards said direction of travel for passage of pressure gas, the open end of said expansible bag being disposed around said opening and supported gastight by said fuel tank, means for igniting said fast-burning propellant and means for igniting said slow-burning propellant at approximately the end of the burning cycle of said fast-burning propellant.

5. A ducted ramjet motor assembly comprising, in combination, an elongated motor housing, a ramjet motor in said housing, said ramjet motor comprising a fuel tank near the front end of said housing as regards its direction of travel, a combustion chamber adjacent the rear end of said housing, a fast-burning rocket propellant mounted in said combustion chamber, a slow-burning rocket propellant intermediate said combustion chamber and said fuel tank, an annular ring disposed intermediate said combustion chamber and said slow-burning propellant, the axis of said annular ring coinciding with the axis of said housing, a pressure-sealing diaphragm separating said fast-burning propellant from said annular ring, a conduit extending from said fuel tank through the wall of said annular ring to form a venturi for passage of fuel from said tank to the throat of said venturi, an inflatable bag in said fuel tank, a conduit leading from the region of said slow-burning propellant into said inflatable bag for pressuring the fuel in said tank when said slow-burning propellant burns, a second ring supported by the inner wall of said housing intermediate said combustion chamber and the first mentioned annular ring, said pressure sealing diaphragm being of smaller diameter than the inner diameter of said housing and hinged to said second ring on the side thereof adjacent said combustion chamber for opening in the direction of said combustion chamber.

6. A ducted ramjet motor assembly comprising, in combination, an elongated motor housing, a ramjet motor in said housing, said ramjet motor comprising a fuel tank near the front end of said housing as regards its direction of travel, a combustion chamber adjacent the rear end of said housing, a fast-burning rocket propellant mounted in said combustion chamber, a slow-burning rocket propellant intermediate said combustion chamber and said fuel tank, an annular ring disposed intermediate said combustion chamber and said slow-burning propellant, the axis of said annular ring coinciding with the axis of said housing, a pressure-sealing diaphragm separating said fast-burning propellant from said annular ring, a conduit extending from said fuel tank through the wall of said annular ring to form a venturi for passage of fuel from said tank to the throat of said venturi, an inflatable bag in said fuel tank, a conduit leading from the region of said slow-burning propellant into said inflatable bag for pressuring the fuel in said tank when said slow-burning propellant burns, a second ring supported by the inner wall of said housing intermediate said combustion chamber and the first mentioned annular ring, said pressure sealing diaphragm being of smaller diameter than the inner diameter of said housing and hinged to said second ring on the side thereof adjacent said combustion chamber for opening in the direction of said combustion chamber wherein said diaphragm is made of a combustible material.

7. A ducted ramjet motor assembly comprising, in combination, an elongated motor housing, a ramjet motor in said housing, said ramjet motor comprising a fuel tank near the front end of said housing as regards its direction of travel, a combustion chamber adjacent the rear end of said housing, a fast-burning rocket propellant mounted in said combustion chamber, a slow-burning rocket propellant intermediate said combustion chamber and said fuel tank, an open end expansible bag in said fuel tank, an opening in the rear end of said fuel tank as regards said direction of travel for passage of pressure gas, the open end of said expansible bag being disposed around said opening and supported gastight by said fuel tank, an annular ring disposed intermediate said combustion chamber and said slow-burning propellant, the axis of said annular ring coinciding with the axis of said housing, a removable diaphragm intermediate said combustion chamber and said annular ring, a conduit extending from said fuel tank through the wall of said annular ring to form a venturi for passage of fuel from said tank to the throat of said venturi, a deflector disc disposed on the side of said venturi adjacent said diaphragm to deflect gases passing through said venturi toward the walls of said combustion zone, and a second ring supported by the inner wall of said housing intermediate said combustion chamber and the first mentioned annular ring, said diaphragm being of smaller diameter than the inner diameter of said housing and hinged to said second ring on the side thereof adjacent said combustion chamber for opening in the direction of said combustion chamber.

References Cited in the file of this patent
UNITED STATES PATENTS

| | | |
|---|---|---|
| 1,273,466 | Doble | July 23, 1918 |
| 2,419,866 | Wilson | Apr. 29, 1947 |
| 2,657,532 | Reid et al. | Nov. 3, 1953 |
| 2,701,441 | Mitchell | Feb. 8, 1955 |
| 2,711,630 | Lehman | June 28, 1955 |
| 2,753,801 | Cumming | July 10, 1956 |
| 2,799,987 | Chandler | July 23, 1957 |
| 2,912,820 | Whitmore | Nov. 17, 1959 |
| 2,939,281 | Conyers | June 7, 1960 |
| 2,940,256 | Conyers et al. | June 14, 1960 |